United States Patent
Zimmerman et al.

(10) Patent No.: US 11,611,630 B2
(45) Date of Patent: Mar. 21, 2023

(54) ASSISTED MULTIMEDIA CONTENT ENHANCEMENT

(71) Applicant: Western Digital Technologies, Inc., San Jose, CA (US)

(72) Inventors: Israel Zimmerman, Ashdod (IL); Eyal Hakoun, Gesher HaZiv (IL); Michael Zaidman, Modiin (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/115,146

(22) Filed: Dec. 8, 2020

(65) Prior Publication Data
US 2022/0182455 A1 Jun. 9, 2022

(51) Int. Cl.
*G06F 15/16* (2006.01)
*H04L 67/561* (2022.01)
*H04L 67/565* (2022.01)

(52) U.S. Cl.
CPC .......... *H04L 67/561* (2022.05); *H04L 67/565* (2022.05)

(58) Field of Classification Search
CPC ... H04L 67/28; H04L 67/2804; H04L 67/561; H04L 67/565
USPC .................................................. 709/217–219
See application file for complete search history.

(56) References Cited

U.S. PATENT DOCUMENTS

| | | | | |
|---|---|---|---|---|
| 9,166,881 | B1* | 10/2015 | Gray | H04L 41/0896 |
| 2005/0138137 | A1* | 6/2005 | Encarnacion | H04L 67/565 |
| | | | | 709/217 |
| 2005/0234983 | A1* | 10/2005 | Plastina | G06F 16/583 |
| | | | | 707/999.107 |
| 2009/0150530 | A1* | 6/2009 | Shohda | H04L 67/14 |
| | | | | 709/222 |
| 2012/0158891 | A1* | 6/2012 | Dooley | H04L 67/5681 |
| | | | | 709/217 |
| 2014/0074924 | A1* | 3/2014 | Yim | H04N 21/43637 |
| | | | | 709/204 |
| 2014/0278969 | A1* | 9/2014 | Newell | G06Q 30/0276 |
| | | | | 705/14.53 |
| 2015/0365491 | A1* | 12/2015 | Chan | H04L 67/06 |
| | | | | 709/219 |
| 2017/0094341 | A1* | 3/2017 | Berner | H04N 21/4325 |
| 2017/0270562 | A1* | 9/2017 | Ben-Rubi | G06Q 30/0251 |
| 2021/0141992 | A1* | 5/2021 | Bernstein | G06F 40/106 |
| 2021/0263678 | A1* | 8/2021 | Glimcher | G06F 3/0659 |
| 2022/0050721 | A1* | 2/2022 | Chen | G06F 9/5044 |

* cited by examiner

*Primary Examiner* — Bharat Barot
(74) *Attorney, Agent, or Firm* — Chang & Hale LLP

(57) ABSTRACT

A method comprises receiving a set of content items comprising a first content item from one or more media devices via a network, transmitting the first content item to a host device for performance of enhancement tasks related to the first content item, receiving a first enhanced content item comprising the first content item and added metadata from the host device, and storing the first content item and the added metadata.

19 Claims, 3 Drawing Sheets

ASSISTED MULTIMEDIA CONTENT ENHANCEMENT

BACKGROUND

Field

This disclosure relates to data storage and enhancement systems. More particularly, the disclosure relates to systems and methods for assisted enhancement of multimedia content in data storage systems.

Description of Related Art

Media devices (e.g., smartphones, cameras, etc.) are becoming more and more powerful and can generate and/or store an increasing amount of multimedia content. In some cases, media devices may store hundreds or even thousands of photos, videos, and/or other content items scattered across a variety of folders and/or devices.

SUMMARY

Some implementations of the present disclosure relate to a method comprising receiving a set of content items comprising a first content item from one or more media devices via a network, transmitting the first content item to a host device for performance of enhancement tasks related to the first content item, receiving a first enhanced content item comprising the first content item and added metadata from the host device, and storing the first content item and the added metadata.

In some embodiments, transmitting the first content item to the host device is performed directly without an intermediate device. Transmitting the first content item to the host device may be performed over a local network.

The method may further comprise receiving an indication of an amount of bandwidth available at the host device. In some embodiments, transmitting the first content item to the host device is based at least in part on the indication of the amount of bandwidth available at the host device.

In some embodiments, the method further comprises transmitting an indication of one or more enhancement tasks to be performed relative to the first content item. The first content item may be stored in a particular storage location indicated by the added metadata. In some embodiments, the method further comprises labeling the first content item to indicate that the first content item has not yet been enhanced.

Some implementations of the present disclosure relate to a storage system comprising one or more host devices and a storage device. The storage device is configured to receive a set of content items comprising a first content item from one or more media devices via a network, transmit the first content item to at least one of the one or more host devices for performance of enhancement tasks related to the first content item, receive a first enhanced content item comprising the first content item and added metadata from the at least one of the one or more host devices, and store the first content item and the added metadata.

The storage device may comprise a network-attached storage device (NAS). In some embodiments, the storage device comprises a universal serial bus (USB) device. In some embodiments, the storage device comprises an internet of things (IoT) device.

In some embodiments, transmitting the first content item to the host device is performed directly without an intermediate device. Transmitting the first content item to the host device may be performed over a local network.

The storage device may be further configured to receive an indication of an amount of bandwidth available at the host device. In some embodiments, transmitting the first content item to the host device is based at least in part on the indication of the amount of bandwidth available at the host device.

In some embodiments, the storage device is further configured to transmit an indication of one or more enhancement tasks to be performed relative to the first content item. The first content item may be stored in a particular storage location indicated by the added metadata. In some embodiments, the storage device is further configured to label the first content item to indicate that the first content item has not yet been enhanced.

Some implementations of the present disclosure relate to a storage device comprising organizing means configured to receive a set of content items comprising a first content item from one or more media devices via a network, transmit the first content item to a host device for performance of enhancement tasks related to the first content item, and receive a first enhanced content item comprising the first content item and added metadata from the host device. The storage device further comprises storage means configured to store the first content item and the added metadata.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
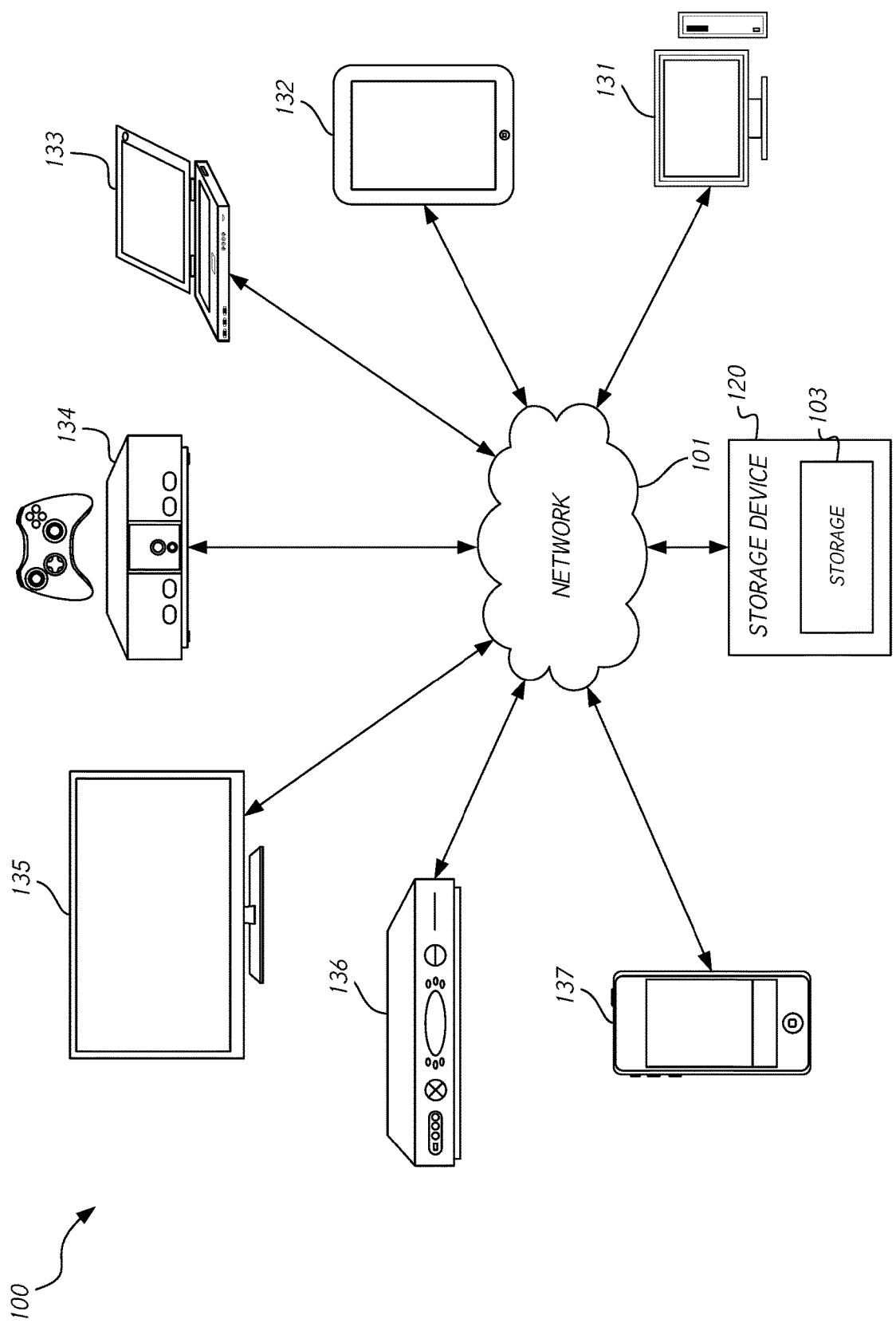
FIG. 1 is a diagram illustrating an embodiment of a network-attached storage device (NAS) system according to one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Media devices (e.g., smartphones, cameras, video cameras, tablets, laptop computers, etc.) are becoming more and more powerful and can generate and/or store an increasing amount of multimedia content. In some cases, media devices may store hundreds or even thousands of photos, videos, and/or other content items scattered across a variety of folders and/or devices. The content items stored on a device may include content items received from multiple media devices. In some cases, content items can include non-digital content converted to a digital form. For example, scanned documents and/or photos and/or analog videos may be converted to digital form and stored on a media device.

Content items may be enhanced in a variety of ways using artificial intelligence (AI) technologies and/or machine learning (ML). For example, content items including faded and/or yellowed photos, low-quality videos and/or audio samples, and/or black and white images may be enhanced to improve quality and/or converted to color using AI and/or ML. Enhancement tasks may be performed by cloud-based and/or locally-installed programs configured to organize content items in a variety of ways using metadata. Metadata can include any data added to a content item, including keyword tags, color labels, etc. In some cases such cloud-based and/or locally-installed programs may be configured to determine similarities between content items using hash and/or other methods and/or to search and/or delete duplicate content items. In some embodiments, programs may be configured to group content data using, for example, time and/or location information (e.g., to group content items as a particular trip, party, etc.) and/or to enhance content items in a variety of ways.

Storage appliances including network-attached storage (NAS) systems can provide a basic multimedia content organizing functionality. NAS drives/systems can provide file-level data storage over a computer network, wherein access to the stored data is accessible to one or more local and/or remote clients. A NAS may include hardware, software, or a combination of such elements, configured such that the NAS operates as a file server for the client(s). NAS devices/systems can provide a convenient mechanism for remotely accessing user data. However, some storage appliances, including NAS systems, can have insufficient computational power to learn and/or store a large amount of multimedia content and/or to classify multimedia content for easier tagging, sorting, organizing, and/or searching "Tagging" may refer to any action involving adding and/or associating metadata to content items such as photos and videos. Such metadata may be gathered by manual and/or automatic assignment. Examples of automatic assignment can include optical character recognition (OCR), facial recognition, and/or scene recognition. Added metadata can include global positioning systems (GPS) time and/or location, various content information including size and/or resolution, media device type (e.g., the device type of the media device that generated the content item), exposure time, and/or any other information that can be searched.

Adding metadata to content items can enhance multimedia content organization and/or lookup capabilities, which may be particularly advantageous for storage devices having relatively low computation power. For example, addition facial information to images including people and/or correlating GPS position to content items to indicate geographic locations (e.g., country, city, tourist attractions, etc.) where content items were generated can assist in classifying and/or searching through content items. Improving multimedia organizing capabilities in low computational power storage devices can eliminate a need for additional tools and/or simplify multimedia content management for end users.

In some cases, multimedia content classification may involve use of deep learning models based on convolutional neural networks (CNNs). A typical use case for a CNN may involve feeding data (e.g., visual imagery content) to the CNN for the CNN to classify the data.

Some embodiments described herein provide systems and/or methods for using relatively high processing capabilities of host devices (e.g., smartphones, laptop and/or desktop computers, etc.) to perform various enhancement tasks for multimedia content items. In some embodiments, a storage device (e.g., a NAS) may be configured to delegate enhancement tasks of content items stored at the storage device. In some cases, host devices may have greater hardware and/or software capabilities than the storage device and therefore delegation to the host devices may advantageously provide faster enhancement, an enhancement of a greater amount of multimedia content, and/or improved enhancement of multimedia content with respect to what the storage device may be capable of performing without delegation.

Storage devices described herein may have a relatively low cost and/or may consume a relatively low amount of power. These storage devices may be enabled to delegate enhancement tasks such that a quality of enhancement may be achieved that may not be possible and/or efficient at the storage devices. In some embodiments, tasks delegated to host devices by the storage devices may include assisted automatic (e.g., AI) functions.

In some embodiments, content enhancement tasks may be transparent and/or near-transparent to end users. For example, a storage device may be accessible via access to a network (e.g., the Internet). As a result, various delegation and/or enhancement tasks may be performed via network access.

Some embodiments described herein may not require organization applications at the host devices due at least in part to organization applications at a storage device. For example, a storage device may comprise one or more organization modules configured to organize and/or categorize multimedia content items. The storage device may be configured to transmit one or more content items to a host device for enhancement tasks (e.g., improving audio and/or visual quality of a content item, performing OCR, converting audio to text, event tagging, calculating similarity hash between items such as image and/or video scenes, detecting objects, performing face recognition, etc.) involving adding metadata to the one or more content items. When the enhancement tasks are complete, the host device may return the one or more content items to the storage device and/or the storage device may be configured to organize the one or more content items using the organization applications at the storage device. The host device may additionally or alternatively be configured to add and/or update a content item metadata datastore at the storage device.

Data Storage Systems

FIG. 1 is a diagram illustrating an embodiment of a data storage system 100, in which a data storage device 120 (e.g., a Network-Attached Storage (NAS) device, Universal Serial Bus (USB) device, and/or Internet of Things (IoT) device) is communicatively coupled to one or more client devices over a network 101 in order to provide data storage services to the devices over the network 101. Types of client devices that may have access to the storage device 120 can include, but are not limited to, phones 137, such as smartphones, cable set-top boxes 136, smart TV's 135, video game consoles 134, laptop computers 133, tablet computers 132, desktop computers 131, wearable computers, and/or other network-connected computing devices. The network 101 may be a local area network (LAN), a wide area network (WAN) (e.g., the Internet), or other type of computer network.

In certain embodiments, the storage device 120 may comprise disk media configured to store user files and/or other data. For example, the storage device 120 may comprise one or more disk drives, wherein the storage device 120 is configured to serve data stored on the one or more disk drives to connected clients. While certain embodiments are described herein in the context of NAS devices/systems, it should be understood that references herein to NAS's may also apply to other types of data storage devices/systems, such as any type of computer device implementing software allowing for organization of various content items including multimedia content.

In some embodiments, the storage device 120 may be configured to provide file-based services and/or to run software to provide additional server functionality. In certain embodiments, the storage device 120 may be configurable over the network 101 by a client device interface, such as a web browser of a mobile or desktop computing device. For example, a low-level operating system may be implemented in the NAS, such as FreeNAS or other open source NAS solution. In certain embodiments, the storage device 120 implements a Linux operating system, or the like. The storage device 120 may provide access to files using one or more network file-sharing protocols, such as Network File System (NFS), Server Message Block (SMB), Common Internet File System (CIFS), Apple Filing Protocol (AFP), or the like.

In certain embodiments, when accessing file(s) stored on the storage device 120, a client/host device may first receive file directory data from the NAS. The file directory data and/or other storage 103 may include, for example, a file allocation table (FAT), or the like. For example, the storage device 120 may implement an operating system (e.g., Linux) that maintains a file system defined by system data (e.g., directory data) identifying files, folders, or other information or metadata associated with the file system. The storage 103 maintained by the storage device 120 may be based on the particular file system implemented by the storage device 120. Any suitable or desirable file system may be used in accordance with the present disclosure. The terms "directory data" and "directory information" are used herein according to their broad and ordinary meaning and may relate to any system data or metadata associated with a file system or architecture, or with files themselves. Directory data may identify file directories, or folders, which may allow a user to group files into separate collections. Directory data may include data associating filenames with indexes in a table of contents (e.g., an inode in a Unix-type file system). The file hierarchy associated with the directory data may be any type of hierarchy, such as a flat (i.e., linear) architecture, or a hierarchy defining directories and subdirectories. The directory data may comprise the metadata associated with the files maintained by the storage device 120, such as file names, file content lengths, file locations in the directory hierarchy, or the like, and may be stored separately from the files that the directory data is associated with, physically and/or logically.

Data Enhancement Systems

Figure 2:
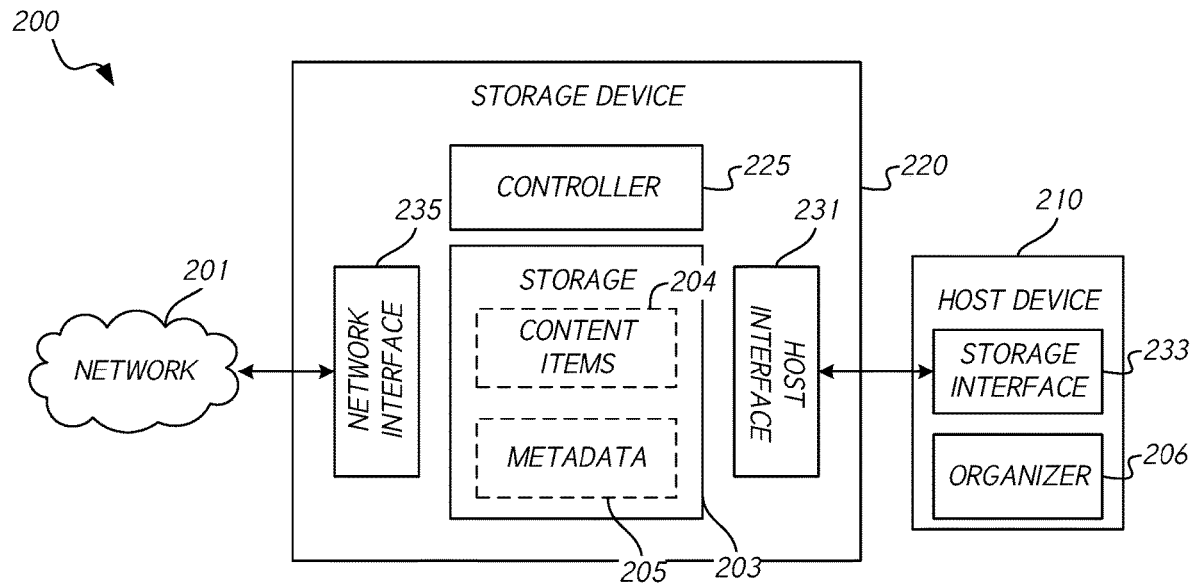
FIG. 2 is a block diagram illustrating a data enhancement system involving communication between a NAS and one or more hosts (i.e., clients) via a network according to an example embodiment.

FIG. 2 is a block diagram illustrating a data enhancement system 200 involving communication between a storage device 220 (e.g., a NAS, USB, and/or IoT device) and one or more hosts (i.e., clients) 210 via a network 201 according to an example embodiment. The storage device 220 may be considered a NAS server device in some embodiments. The storage device 220 may be configured to communicate bi-directionally with one or more hosts 210. The terms "host" and "client" are used herein according to their broad and ordinary meanings and may refer to any media device configured to generate, store, and/or enhance multimedia content. Although the device 220 is illustrated and described as a NAS device in the present disclosure, it should be understood that the device 220 may not be network-accessible, and may be any type of media device (e.g., a smartphone, camera, video camera, etc.).

The host 210 may comprise an organization module 206, which can include organizing means, configured to run any of a variety of programs for organizing multimedia content. The organization module 206 may be configured to tag multimedia content generated and/or received at the host 210. The tagged multimedia content may be transmitted from the host 210 to the device 220 for storage. A storage module 203, which may include storing means, at the device 220 may be configured to store the multimedia content items 204 and/or metadata 205 added to and/or associated with the multimedia content 204. The metadata 205 may include tags added to the multimedia content 204 by the organization module 206 of the host 210. The organization module 206 may be configured to use the stored metadata 205 for searching and/or filtration of the multimedia content 204.

In the embodiment shown in FIG. 2, the host 210 may be configured to delegate storage tasks to the device 220 while performing tagging, categorization, searching, filtration, and/or other tasks at the host 210 (e.g., at the organization module 206). As a result, tasks like tagging, categorization, searching, and/or filtration may be difficult to perform when the multimedia data 204 and/or metadata 205 is accessed by a different host device via a network 201 and/or when the device 220 receives multimedia content 204 and/or metadata 205 from different host devices.

The storage device 220 may comprise a controller 225 providing overall control for the storage device 220. The controller 225 may transmit and/or receive data and storage access commands to/from the host 210 and/or other devices via the network 201. In some embodiments, a Domain Name Server (DNS) may be used in communicating with the NAS storage device 220. The NAS may be callable (e.g., via the network 201) through a web address Uniform Resource Locator (URL).

The connection between the host 210 and the storage device 220 may be wired, such as through Ethernet, USB, or other connection, or may be wireless, such as through WiFi, Bluetooth, or other wireless connection. In some embodiments, the connection between the host 210 and the storage device 220 may be achieved over the Internet, wherein each of the host 210 and the storage device 220 may be connected to the Internet over a wired or wireless connection (e.g., the network 201). The host 210 may be configured to access the storage device 220 substantially without network mapping. The host 210 may access the storage device 220 using any suitable communication protocol, such as CIFS, AFP, or the like.

The storage device 220 may be configured to store data (e.g., content items 204 and/or metadata 205) received from the host 210, such that the storage device 220 may be configured to act as data storage for the host 210 and/or other devices. To facilitate this memory function, the controller 225 may implement a logical interface. The logical interface may present to the host 210 the data storage of the storage device 220 as a set of logical addresses (e.g., contiguous addresses) where data can be stored. The controller 225 may map logical addresses to various physical memory addresses (e.g., in a disk drive) and/or other memory module(s).

The controller 225 may include one or more processors configured execute an operating system, such as a Linux operating system. The controller 225 may implement a file system that is file-based. The controller 225 may include or be coupled to a cache memory module, which may comprise solid-state random access memory (RAM) or NAND flash memory (i.e., flash memory based on logical NAND-type gate structures). In some embodiments, the data path between the NAS and the host 210 may include the cache. Therefore, in providing data to the host 210, the controller 225 may provide such data from a disk drive or the cache.

The storage device 220 may comprise a host interface 231 to allow the storage device 220 to communicate bi-directionally with a storage interface 233 at the host 210. Similarly, the storage device 220 may comprise a network interface 235 to allow the storage device 220 to communicate bi-directionally with various other devices via the network 201. In some embodiments, the host interface 231 can include a wire-based data port. For example, the host interface 231 may comprise a USB bridge for transmission of data between the storage device and the host 210.

In some embodiments, the storage device 220 may be configured to emulate a network adapter (e.g., a Wi-Fi adapter) to initiate a captive portal at the host 210. For example, when the storage device 220 (e.g., a USB device) is connected to the host 210, the controller 225 and/or other module may be configured to emulate a generic Wi-Fi adapter (e.g., a standard PnP Wi-Fi adapter) that may be supported by the operating system of the host 210. Such an emulated device may be configured to communicate with the operating system of the host 210 without requiring additional drivers, software, and/or special settings. The emulated network adapter may be seen as a USB device by the host 210.

The controller 225 may be configured to send, via the host interface 231, a notification of a new network to the host 210. The notification may be received at the host 210 and/or may be displayed at a graphical user interface at the host 210 to allow a user to select to connect to join the new network. The host 210 may be configured to transmit (e.g., in response to a selection to connect by a user) a request to join the new network to the storage device 220. The storage device 220 may be configured to send a further notification to the host 210 in response to the request. The further notification may be configured to trigger a captive portal at the host 210. The captive portal can facilitate additional communication between the storage device 220 and the host device 210 for use in performing the various enhancement tasks described herein.

In other applications, captive portals are generally web page(s) used with public Wi-Fi hotspots to enable authorized login and/or registration requests for future advertising lists. A typical scenario includes a device joining a new Wi-Fi network, whereby an automatic browser startup may be initiated and/or directed to a web page associated with the new Wi-Fi network (and/or the operator of that Wi-Fi network).

In some embodiments described herein, the storage device 220 may be configured to utilize captive portal capabilities in the operating system of the host 210 to enable additional communication without additional device drivers and/or software. The captive portal may be stored in the storage module 203 to allow the storage device 220 to emulate the captive portal webpage on an emulated new network. In some embodiments, the storage device 220 (e.g., a USB device) may be configured to utilize capabilities of the host 210 for various enhancement tasks without the performance of the enhancement tasks interfering with other operations at the host 210. For example, a user of the host 210 may not be aware that the enhancement tasks are being performed at the host 210.

Figure 3:
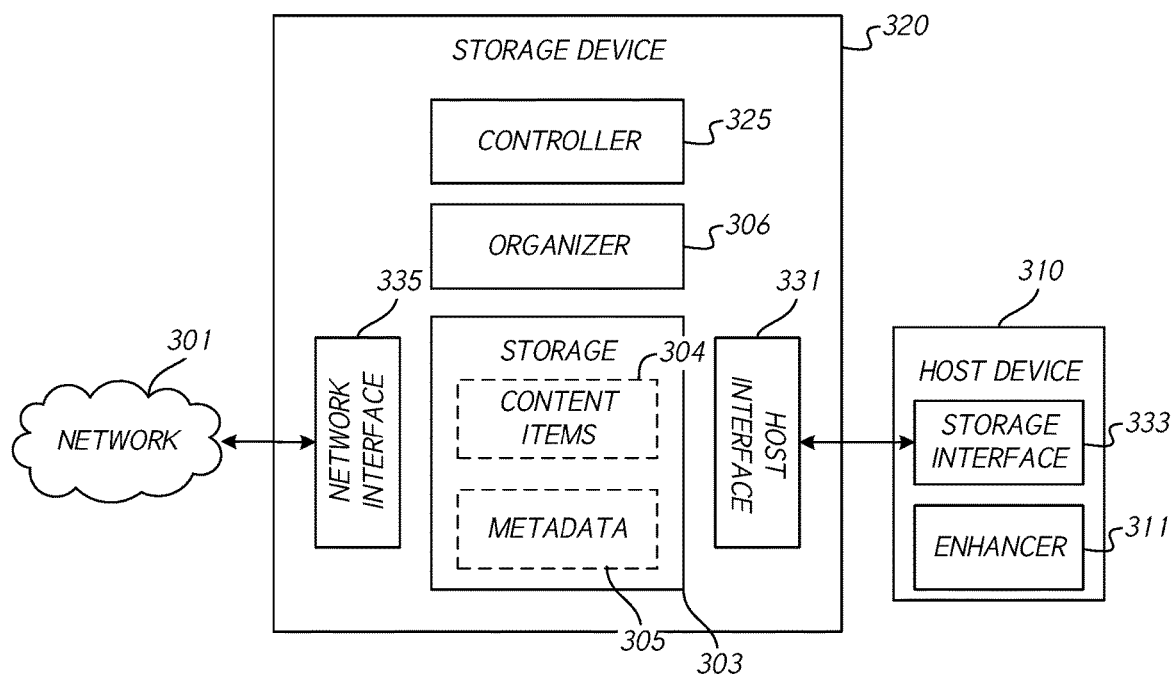
FIG. 3 is a block diagram illustrating another data enhancement system involving communication between a NAS and one or more hosts via a network according to an example embodiment.

FIG. 3 is a block diagram illustrating another data enhancement system 300 involving communication between a storage device 320 (e.g., a NAS, USB, and/or IoT device) and one or more hosts 310 via a network 301 according to an example embodiment. While only a single host 310 is shown in FIG. 3, the storage device 320 may be configured to communicate bi-directionally with multiple hosts 310. The storage device 320 may comprise an organization module 306 configured to perform a variety of tasks related to organization of content items 304 stored at the storage device 320. In some embodiments, the organization module 306 may be configured to transfer content items to one or more hosts 310. A host may comprise an enhancement module 311 configured to perform any of a variety of enhancement tasks, which may involve adding and/or associating metadata 305 to the content items 304.

The one or more hosts 310 may include one or more devices from a group of device types comprising a personal computer, tablet, mobile phone, smartphone, network router, television set-top box and/or any other computational device reachable via the network 301. In some embodiments, the one or more hosts 310 may have higher computational power than the storage device 320.

One or more content items may be transmitted from the storage device 320 to a particular host 310 on a selective basis. For example, the organization module 306 of the storage device 320 may be configured to transmit a content item to a host 310 based at least in part on a determination that the host 310 has an available performance quota sufficient to handle enhancement tasks related to the content item 304. The available performance quota of the host 310 may be determined by the host 310 requesting a quota response from the host 310 and/or by the host 310 transmitting a quota report to the storage device 320 in response to a request or not in response to a request (e.g., on a periodic basis and/or upon establishing a connection to the storage device 320). In some embodiments, different content items 304 may be transmitted to different hosts 310. For example, the storage device 320 may receive multiple content items 304 from various devices (e.g., via the network 301) and may be configured to delegate/transmit a first content item 304 of the multiple content items 304 to a first host 310 and/or to delegate/transmit a second content item 304 of the multiple content items 304 to a second host 310. In this way, enhancement of the multiple content items 304 may be performed more efficiently as multiple content items 304 may be enhanced simultaneously at different hosts 310.

The enhancement module 306 at the host 310 may be configured to generate metadata 305 and/or transmit metadata 305 to the storage device 320 for storage and/or for use in organizing the content items 304 at the storage device 320. Metadata 305 can include labels, categories, weights, scores, probabilities, and/or any other data which may be added to and/or associated with content items 304. The organization module 306 at the storage device 320 may be configured to use the metadata 305 to organize the content items 304 and/or to perform lookups of the content items 304. For example, the organization module 306 may be configured to search through the content items 304 for items of interest (e.g., people and/or places searched by names). Identifiers (e.g., names) of items of interest may be stored as metadata 305 and/or may be searchable. In some embodiments, searches of the content items 304 may be initiated via requests received at the storage device 320 via the network

301. For example, a user may access an Internet (e.g., cloud-based) service for allowing users to search through the content items 304.

In some embodiments, content items 304 received at the storage device 320 (e.g., via the network 301) may be initially labeled (e.g., by the organization module 306) with a first label to indicate that the content items 304 have not yet been enhanced and/or transmitted to an enhancement module 311 for enhancement. While in some embodiments all content items 304 received at the storage device 320 may be transmitted for enhancement at an enhancement module 311 of a host 310, in other embodiments only content items 304 needing enhancement may be labeled as requiring enhancement while content items 304 not needing enhancement may be labeled as not requiring enhancement. In such embodiments, only content items 304 labeled as requiring enhancement may be transmitted to an enhancement module 311 for enhancement. For example, content items 304 identified as being low quality and/or otherwise in condition for enhancement (e.g., low resolution images and/or videos and/or files having a non-standard format such as Video Object (VOB), Module (MOD), Moving Picture Experts Group 2 (MPEG2), and/or Matroska (MKV) in need of transcoding to a new format such as MKV and/or Moving Picture 4 (MP4)) may be transmitted to a host 310 and/or an enhancement module 306.

The enhancement module 306 may be configured to receive content items 304 from the storage device 320 that have been labeled as being in condition for enhancement. The enhancement module 311 may be configured to perform any of a variety of enhancement tasks for a given content item 304. In some embodiments, the enhancement tasks performed at the enhancement module 311 for a content item 304 may be controlled by the organization module 306 of the storage device 320. For example, when a content item 304 is received at the storage device 320, the organization module 306 may be configured to add any of a variety of labels to the content item 304 to indicate particular enhancement tasks (e.g., colorizing an image, improving image/video quality, tagging a person and/or place, converting a file to a standard format, etc.) to be performed for the content item 304. The enhancement module 306 may be configured to return enhanced content items 304 (including added metadata 305) to the storage device 320 following performance of the various enhancement tasks.

In some embodiments, the storage device 320 may be configured to transmit a full content item 304 and/or a partial content item 304 (e.g., a portion of a full content item 304) to the host 310. Following completion of enhancement tasks, the host 310 may return the full content item 304 and/or partial content item 304 to the storage device 320 rather than simply returning metadata 305 to the storage device 320. The storage device 320 may advantageously organize (e.g., categorize) the stored content items 304 such that an organization module 306 may not be required at the host 310.

Transmission of content items 304 and/or metadata 305 between the storage device 320 and the host 310 may be performed over any type of network 301, including a local area network (LAN), the Internet, an intranet, Bluetooth, near-field communication (NFC), and/or any other type of network 301. In some embodiments, transmission of content items 304 and/or metadata 305 between the storage device 320 and the host 310 may be performed directly between the storage device 320 and the host 310 (e.g., using a LAN) without intermediate transfer to any other devices. Accordingly, privacy of the transferred content may be maintained without introducing risk of interception of the content items 304 and/or metadata 305 by other devices.

In some embodiments, the storage device 320 may be configured to determine which host 310 of potentially multiple hosts 310 will receive a particular content item 304 and/or a particular portion of a content item 304. For example, the storage device 320 may be configured to divide content items and/or portions of content items (e.g., individual frames of video files) for assignment as different tasks for different hosts 310. The various hosts 310 receiving content items 304 and/or portions of content items 304 from the storage device 320 may be configured to perform any of a variety of enhancement tasks, including upscaling images and/or videos, fixing image issues (e.g., red eye), fixing image rotation, converting black and white images and/or videos to color, and/or any of a variety of other tasks. Following performance of these tasks, the hosts 310 may have an enhanced content item 304 and/or a portion of an enhanced content item 304, and the hosts 310 may be configured to transmit the enhanced content item 304 and/or the portion of the enhanced content item 304 back to the storage device 320.

The storage device 320 may be configured give permissions to certain identified hosts 310 within a given network 301 area to allow transmissions of content items 304 to the identified hosts 310. In some embodiments, one or more hosts 310 may be associated with the storage device 320 as slave devices for delegation of enhancement tasks from the storage device 320. If a host 310 leaves a network 301 area during performance of one or more enhancement tasks, the tasks may be terminated and/or the storage device 320 may select a different host 310 to perform the one or more enhancement tasks. In some cases, performance of enhancement tasks may continue for any amount of time, including multiple hours, days, weeks, and/or months.

In some embodiments, suitable hosts 310 may include devices that are always or almost always in an on-state and/or awake state. For example, a host 310 may include a mobile phone (e.g., a smartphone) which can be almost always in an on-state and/or may not enter a sleep state even over a long period of time.

In some embodiments, the organization module 306 and/or storage module 303 (which can include one or more disk drives) may be mounted in an enclosure of the storage device 320 or otherwise communicatively coupled to the storage device 320. The storage module 303 may include non-volatile magnetic disk media. In some embodiments, the storage device 320 may be, for example, a hybrid hard drive including both magnetic media and solid-state media. The storage module 303 may comprise one or more disks that have been coated with a magnetic film. The film may be configured to have data written thereon by sending electrical pulses to a magnetic read/write head that is part of a head assembly.

The storage device 320 may comprise a controller 325 providing overall control for the storage device 320. While the controller 325 is shown as a separate component from the organization module 306, the controller 325 and organization module 306 may comprise a single component. The controller 325 may transmit and/or receive data and storage access commands to/from the host 310 and/or other devices via the network 301. In some embodiments, a DNS may be used in communicating with the storage device 320. The NAS may be callable (e.g., via the network 301) through a web address URL.

The connection between the host 310 and the storage device 320 may be wired, such as through Ethernet, USB, or other connection, or may be wireless, such as through WiFi, Bluetooth, or other wireless connection. In some embodiments, the connection between the host 310 and the storage device 320 may be achieved over the Internet, wherein each of the host 310 and the storage device 320 may be connected to the Internet over a wired or wireless connection (e.g., the network 301). The host 310 may be configured to access the storage device 320 substantially without network mapping. The host 310 may access the storage device 320 using any suitable communication protocol, such as CIFS, AFP, or the like.

The storage device 320 may be configured to store data (e.g., content items 304 and/or metadata 305) received from the host 310, such that the storage device 320 may be configured to act as data storage for the host 310 and/or other devices. To facilitate this memory function, the controller 325 may implement a logical interface. The logical interface may present to the host 310 the data storage of the storage device 320 as a set of logical addresses (e.g., contiguous addresses) where data can be stored. The controller 325 may map logical addresses to various physical memory addresses (e.g., in a disk drive) and/or other memory module(s).

The controller 325 may include one or more processors configured execute an operating system, such as a Linux operating system. The controller 325 may implement a file system that is file-based. The controller 325 may include or be coupled to a cache memory module, which may comprise solid-state RAM or NAND flash memory (i.e., flash memory based on logical NAND-type gate structures). In some embodiments, the data path between the NAS and the host 310 may include the cache. Therefore, in providing data to the host 310, the controller 325 may provide such data from a disk drive or the cache.

The storage device 320 may comprise a host interface 331 to allow the storage device 320 to communicate bi-directionally with a storage interface 333 at the host 310. Similarly, the storage device 320 may comprise a network interface 335 to allow the storage device 320 to communicate bi-directionally with various other devices via the network 301.

Content Enhancement Processes

Figure 4:
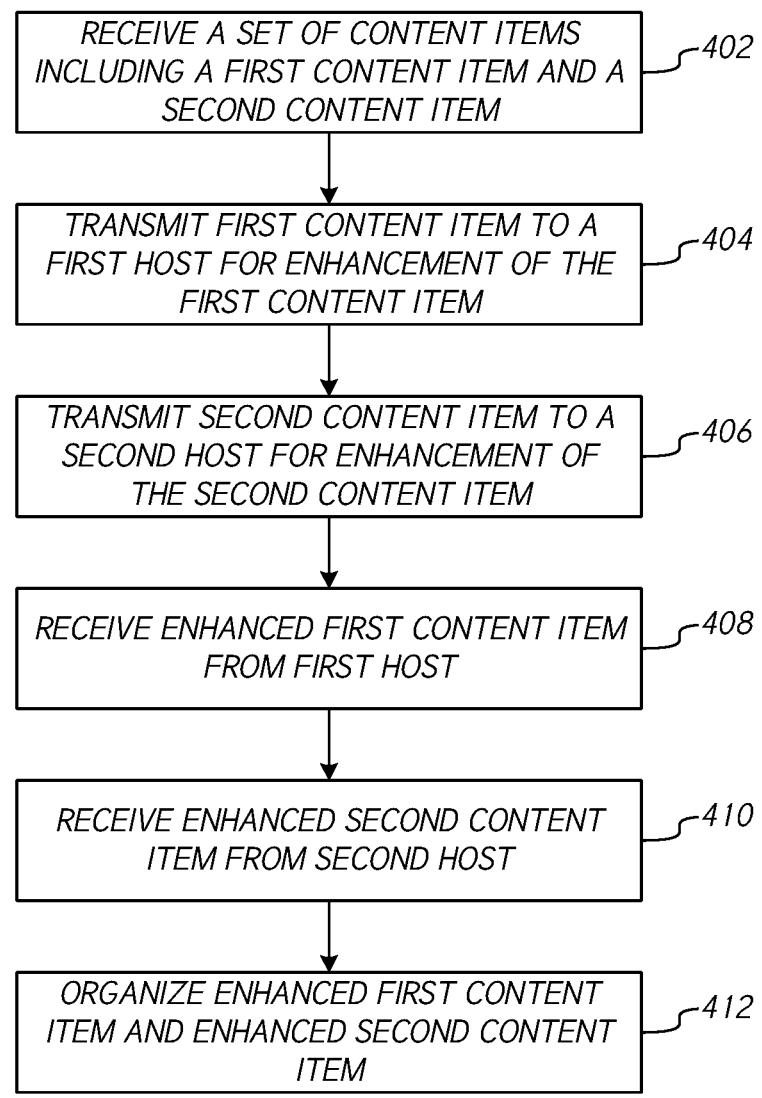
FIG. 4 is a flow diagram illustrating a process 400 for assisted performance of multimedia content enhancement tasks within a wired or wireless network according to one or more embodiments disclosed herein.

FIG. 4 is a flow diagram illustrating a process 400 for assisted performance of multimedia content enhancement tasks within a wired or wireless network according to one or more embodiments disclosed herein. At block 402, the process 400 involves receiving a set of one or more content items over a wired and/or wireless network (e.g., the Internet). The content items can include any of a variety of forms of multimedia content including images, videos, audio samples, etc. The one or more content items may include at least a first content item and a second content item. In some embodiments, the one or more content items may be received at a storage device (e.g., a NAS) from a media device (e.g., a smartphone, personal computer, etc.). The storage device may be configured to store and/or perform various enhancement and/or organization tasks related to the received one or more content items. In some embodiments, the one or more content items may have associated metadata, which may be indicative of various features of the one or more content items (e.g., titles, device types, content specifications include item size, etc.).

At block 404, the process 400 involves transmitting the first content item to a first host of one or more hosts for enhancement of the first content item. Transmission of the first content item to the first host may be performed directly between the transmitting device (e.g., a NAS) and the first host without an intermediate device. In some embodiments, the transmitting device (e.g., a NAS) and the first host may be positioned locally to each other such that transmission of the first content item may be performed over a local network (e.g., a wired network, a LAN, Bluetooth, etc.). The first content item may be transmitted to the first host based at least in part on a determination that the first host has sufficient bandwidth to perform various enhancement tasks related to the first content item. For example, a NAS may receive a communication from the first host indicating an amount of bandwidth available at the first host. The NAS may determine that the indicated amount of bandwidth at the first host is sufficient to handle the first content item and/or to perform various enhancement tasks related to the first content item and may transmit the first content item to the first host in response to this determination. When transmitting the first content item to the first host, the transmitting device (e.g., a NAS) may indicate particular enhancement tasks to be performed related to the first content item (e.g., improving image quality, etc.). The transmitting device may be configured to determine which enhancement tasks to perform for the first content item based on an analysis of the first content item at the transmitting device.

At block 406, the process 400 involves transmitting the second content item to a second host of the one or more hosts for enhancement of the second content item. Transmission of the second content item to the second host may be performed directly between the transmitting device (e.g., a NAS) and the second host without an intermediate device. In some embodiments, the transmitting device (e.g., a NAS) and the second host may be positioned locally to each other such that transmission of the second content item may be performed over a local network (e.g., a wired network, a LAN, Bluetooth, etc.). The second content item may be transmitted to the second host based at least in part on a determination that the second host has sufficient bandwidth to perform various enhancement tasks related to the second content item. For example, a NAS may receive a communication from the second host indicating an amount of bandwidth available at the second host. The NAS may determine that the indicated amount of bandwidth at the second host is sufficient to handle the second content item and/or to perform various enhancement tasks related to the second content item and may transmit the second content item to the second host in response to this determination. When transmitting the second content item to the second host, the transmitting device (e.g., a NAS) may indicate particular enhancement tasks to be performed related to the second content item (e.g., improving image quality, etc.). The transmitting device may be configured to determine which enhancement tasks to perform for the second content item based on an analysis of the second content item at the transmitting device.

In some embodiments, the first content item and the second content item may be transmitted simultaneously and/or near-simultaneously. Thus, the first host may hold the first content item simultaneously to the second host holding the second content item. Additional content items of the one or more content items may be transmitted to additional hosts and/or to the first host and/or the second host.

At block 408, the process 400 involves receiving an enhanced version of the first content item from the first host. In some embodiments, the enhanced first content item may comprise the first content item originally transmitted to the first host and/or additional metadata added to and/or associated with the first content item. Such metadata may include labels, categories, weights, scores, probabilities, and/or any of a variety of metadata types which may be used to organizing the first content item and/or making the first content item searchable at a storage device (e.g., a NAS).

At block 410, the process 400 involves receiving an enhanced version of the second content item from the second host. In some embodiments, the enhanced second content item may comprise the second content item originally transmitted to the second host and/or additional metadata added to and/or associated with the second content item. Such metadata may include labels, categories, weights, scores, probabilities, and/or any of a variety of metadata types which may be used to organizing the second content item and/or making the second content item searchable at a storage device (e.g., a NAS).

At block 412, the process 400 involves organizing the enhanced first content item and the enhanced second content item at a storage device (e.g., a NAS). Organizing may involve storing the first content item and/or second content item within particular files as indicated by metadata associated with the first content item and/or second content item. For example, the metadata may comprise labels and/or categories which may correspond to particular storage locations at the storage device.

Additional Embodiments

Those skilled in the art will appreciate that in some embodiments, other types of enhancement task delegation systems, devices and methods can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, Application-Specific Integrated Circuit (ASIC), Field-Programmable Gate Array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A method comprising:
receiving, from one or more media devices via a network, a set of content items comprising a first content item and a second content item, the first content item comprising an image file or video file;
selecting a first host device from a plurality of host devices based on an available resource bandwidth of the first host device;
transmitting the first content item to the first host device for performance of enhancement tasks related to the first content item;
receiving, from the first host device, a first enhanced content item comprising the first content item and first added metadata, the first added metadata indicating one or more persons, items, or locations identified by the first host device as being related to the first content item;
storing the first enhanced content item in a first storage location associated with the one or more persons, items, or locations indicated by the first added metadata;
selecting a second host device from the plurality of host devices based on an available resource bandwidth of the second host device;
transmitting a second content item to the second host device for performance of enhancement tasks related to the second content item;
receiving, from the second host device, a second enhanced content item comprising the second content item and second added metadata; and
storing the second enhanced content item in a second storage location.

2. The method of claim 1, wherein transmitting the first content item to the first host device is performed directly without an intermediate device.

3. The method of claim 1, wherein transmitting the first content item to the first host device is performed over a local network.

4. The method of claim 1, further comprising receiving, from the first host device, an indication of the available resource bandwidth of the first host device.

5. The method of claim 1, further comprising transmitting an indication of one or more enhancement tasks to be performed relative to the first content item.

6. The method of claim 1, wherein the first storage location is different from the second storage location.

7. The method of claim 1, further comprising labeling the first content item to indicate that the first content item has not yet been enhanced.

8. The method of claim 1, further comprising transmitting a file directory to the first host device, wherein the first storage location identified by the first host device is a file location of the file directory.

9. The method of claim 1, wherein the enhancement tasks comprise facial recognition associated with the first content item.

10. The method of claim 1, wherein the enhancement tasks comprise scene recognition associated with the first content item.

11. A data storage system comprising:
one or more host devices; and
a data storage device configured to:
receive, from one or more media devices via a network, a set of content items comprising a first content item and a second content item, the first content item comprising an image file or video file;

select a first host device from a plurality of host devices based on an available resource bandwidth of the first host device;

transmit the first content item to the first host device for performance of enhancement tasks related to the first content item;

receive, from the first host device, a first enhanced content item comprising the first content item and first added metadata, the first added metadata indicating one or more persons, items, or locations identified by the first host device as being related to the first content item;

store the first enhanced content item in a first storage location associated with the one or more persons, items, or locations indicated by the first added metadata;

select a second host device from the plurality of host devices based on an available resource bandwidth of the second host device;

transmit the second content item to the second host device for performance of enhancement tasks related to the second content item;

receive, from the second host device, a second enhanced content item comprising the second content item and second added metadata; and store the second enhanced content item in a second storage location.

12. The data storage system of claim 11, wherein the data storage device comprises a network-attached storage device (NAS).

13. The data storage system of claim 11, wherein the data storage device comprises a universal serial bus (USB) device.

14. The data storage system of claim 11, wherein transmitting the first content item to the first host device is performed directly without an intermediate device.

15. The data storage system of claim 11, wherein transmitting the first content item to the first host device is performed over a local network.

16. The data storage system of claim 11, wherein the data storage device is further configured to receive, from the first host device, an indication of an amount of available bandwidth at the plurality of host devices, wherein transmitting the first content item to the first host device is based at least in part on the indication of the amount of bandwidth available at the plurality of host devices.

17. The data storage system of claim 11, wherein the data storage device is further configured to transmit an indication of one or more enhancement tasks to be performed relative to the first content item.

18. The data storage system of claim 11, wherein the data storage device is further configured to label the first content item to indicate that the first content item has not yet been enhanced.

19. A data storage device comprising:
organizing means configured to:
receive, from one or more media devices via a network, a set of content items comprising a first content item and a second content item, the first content item comprising an image file or video file;

select a first host device from a plurality of host devices based on an available resource bandwidth of the first host device;

transmit the first content item to the first host device for performance of enhancement tasks related to the first content item;

receive, from the first host device, a first enhanced content item comprising the first content item and first added metadata, the first added metadata indicating one or more persons, items, or locations identified by the first host device as being related to the first content item;

select a second host device from the plurality of host devices based on an available resource bandwidth of the second host device;

transmit a second content item to the second host device for performance of enhancement tasks related to the second content item; and receive, from the second host device, a second enhanced content item comprising the second content item and second added metadata; and storage means configured to:
store the first enhanced content item in a first storage location associated with the one or more persons, items, or locations indicated by the first added metadata; and store the second enhanced content item in a second storage location.

\* \* \* \* \*